United States Patent [19] [11] 3,725,462
Boldt et al. [45] Apr. 3, 1973

[54] PROCESS FOR THE MANUFACTURE OF SUBSTITUTED PHENYL ESTERS AND OPTIONALLY SUBSTITUTED PHENOLS

[75] Inventors: Manfred Boldt; Hans-Jürgen Arpe, both of Fischbach/Taunus; Lothar Hörnig, Frankfurt/Main, all of Germany

[73] Assignee: Farbwerke Hoechst Aktiengesellschaft vormals Meister Lucius & Bruning, Frankfurt/Main, Germany

[22] Filed: Sept. 19, 1968

[21] Appl. No.: 760,962

[30] Foreign Application Priority Data

Sept. 23, 1967 Germany..................P 16 43 361.7

[52] U.S. Cl. ..............................................260/479 R
[51] Int. Cl..............................................C07c 69/14
[58] Field of Search ..................................260/479 R

[56] References Cited

UNITED STATES PATENTS 3,493,605 2/1970 Selwitz................................260/488
3,190,912 6/1965 Robinson et al.....................260/497

OTHER PUBLICATIONS

Davidson et al. Chem. & Ind. (March, 1966), page 457

Primary Examiner—James A. Patten
Attorney—Curtis, Morris & Safford

[57] ABSTRACT

Manufacture of substituted phenyl esters and optionally substituted phenols by reaction of a substituted benzene with an aliphatic or cycloaliphatic carboxylic acid and oxygen in the presence of a noble metal of Group VIII of the Mendeleeff Periodic Table and/or a compound thereof.

6 Claims, No Drawings

PROCESS FOR THE MANUFACTURE OF SUBSTITUTED PHENYL ESTERS AND OPTIONALLY SUBSTITUTED PHENOLS

The present invention relates to a process for the manufacture of substituted phenyl esters and optionally substituted phenols.

It has already been proposed to make acetic acid phenyl ester from benzene and acetic acid in the liquid as well as in the gaseous phase in the presence of oxygen and a noble metal of sub-group 8 of the Mendeleeff Periodic Table, the stable valency of which in its compounds is at most 4, preferably palladium.

The present invention provides a process for the manufacture of phenyl esters substituted in the nucleus and optionally phenols substituted in the nucleus from correspondingly substituted benzene, which comprises reacting a substituted benzene with a saturated aliphatic or cycloaliphatic carboxylic acid and molecular oxygen in the presence of a noble metal of sub-group 8 of the Mendeleeff Periodic Table, the stable valency of which in its compounds is at most 4 and/or a compound of this noble metal.

As substituted benzenes suitable for use as starting materials it is advantageous to use halogenated benzenes and phenyl ethers in which the benzene nucleus contains up to 5 substituents. There are preferably used compounds of the following general formula

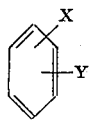

in which X represents a halogen, fluorine, chlorine or bromine atom or the radical —OR, and Y is a fluorine, chlorine or bromine atom or the radical —OR, R being advantageously and alkyl or cycloalkyl group with up to 10 carbon atoms. Examples of such compounds are: fluorobenzene, chlorobenzene, bromobenzene, o-dichlorobenzene, anisole, the different chloranisoles and phenetole.

As carboxylic acids there may be used saturated aliphatic or cycloaliphatic monocarboxylic acids, advantageously those containing up to 8 carbon atoms, or the mixtures thereof. There are advantageously used propionic acid, butyric acid, isobutyric acid, and preferably acetic acid. The carboxylic acids are advantageously used in a concentrated form. Relatively large amounts of water of, for example, up to 10 percent by weight are not disturbing, however. Nor is the presence of corresponding anhydrides in amounts of, for example, up to 30 percent by weight annoying.

The oxygen may be introduced in an elementary form or in the form of air.

As noble metals the elements rhodium, iridium, platinum, ruthenium and preferably palladium may be used, advantageously in a finely divided form. As noble metal compounds there may be used salts of the noble metals with inorganic acids or advantageously with carboxylic acids or complex compounds of these compounds with unsaturated or aromatic compounds. Examples of suitable noble metal compounds are palladium chloride, palladium sulfate, palladium nitrate, palladium acetate, the complex of benzene and palladium acetate, and compounds of alkali metal acrylates, preferably alkali metal acetates with palladium acetate.

It is also possible to use noble metal oxides, for example palladium oxide.

The reaction may be carried out in the liquid or in the gaseous or vapor phase.

When working in the liquid phase, the catalyst may, for example, be finely divided, dispersed or dissolved in the reaction liquid or it may be supported on a carrier. When proceeding in the gaseous or vapor phase, the catalyst is advantageously supported on a carrier. As reaction liquid for the liquid phase, the aliphatic carboxylic acid or the substituted benzene used as starting substances or a mixture of the reaction components may be used. A particularly advantageous form of the liquid phase is the trickling phase.

Examples of suitable carriers are: aluminum oxide, aluminum silicate, silica gel, carbon, zeolites, pumice, clays, fledspars and molecular sieves.

The concentration of the noble metals or of the compounds thereof may vary within wide limits. It is advantageous to use concentrations within the range of from 0.1 to 10 percent by weight calculated on the total liquid when working in the liquid phase, and from 0.1 to 10 percent calculated on the total weight of the system of carrier and catalyst when working in the gaseous phase. Concentrations outside this range may, however, also be used.

In addition to the noble metals, transition metals, for example, gold, copper, silver, iron and manganese, or elements of group 5 or 6 of the Mendeleeff Periodic Table, for example, antimony, bismuth, selenium and tellurium, may advantageously be added as promoters. These substances are preferably used in concentrations of up to 50 atom percent calculated on the noble metal. An optimum effect is obtained with about 25 to 35 atom percent of promoter.

In addition to the catalysts and promoters, activators may be used which may consist of salts of strong bases with weak acids, for example, alkali metal acylates, cadmium acylates, zinc acylates or acylates of rare earths, or of salts which form a buffer system with the carboxylic acid used as starting material, for example alkali metal phosphates, or of acid salts, for example, acid phosphates or bisulfates. There are preferably used the alkali metal salts of the carboxylic acid used in a given case, for example, the alkali metal acetates which are added to the reaction solution or which may be also supported on the arrier. The amount of activator may vary within wide limits and is advantageously within the range of from 0.1 to 10 percent by weight.

During the reaction the concentration of the activator in the catalyst should remain constant. Losses which may be caused by a volatility of the compounds in the course of the reaction are advantageously compensated by adding the activators, for example, continuously to the reaction components.

The reaction conditions used may vary within wide limits. The reaction temperatures are advantageously within the range of from 50° to 300°C, preferably 100°C to 250°C. Depending on the test conditions, the reaction is advantageously carried out in the liquid phase at a temperature within the range of from 50°C to the boiling temperature of the reaction mixture, and in the gaseous phase at a temperature above the boiling point of the reactants. The reaction may be carried out under atmoshperic pressure, reduced or superatmospheric pressure, advantageously a pressure within the range of from 1 to 30, preferably 1 to 15, atmospheres absolute.

The mixing ratios of the reactants may also vary within wide limits. It is, for example, possible to use the substituted benzene or the carboxylic acid in an amount up to 4 times in excess. Any amounts of unreacted starting materials are advantageously recycled.

By the reaction, the carboxylic acid esters of the substituted phenols are obtained either alone or in admixture with the corresponding unesterified phenols.

The mixing ratio of the resulting products and the position of the oxacyl or hydroxyl group newly introduced into the aromatic nucleus generally depend to a certain extent on the reaction conditions, for example, the molar ratio of the reactants, the temperature, pressure and residence time. Chlorobenzene, for example, yields o-chlorophenyl acetate, optionally in admixture with o-chlorophenol, while the reaction of anisole yields 2-acetoxyanisole and 4-acetoxyanisole in a ratio of about 4 : 1.

The reaction mixture is worked up by known methods. The esters may be used as such or they may be split by hydrolysis into phenol substituted in the nucleus and carboxylic acid. The carboxylic acid may be recycled to the reaction.

The process in accordance with the invention enables hydroxyl groups to be introduced directly into aromatic compounds which can otherwise be hydroxylated only in a complicated manner under difficult conditions.

The following examples serve to illustrate the invention, but are not intended to limit it.

EXAMPLE 1

In a flask provided with stirring means, reflux condenser, thermometer and gas inlet pipe, 15 g (0.133 moles) chlorobenzene, 75 g (1.25 moles) acetic acid, 2.4 g (0.0225 gram-atom) palladium (precipitated from PdCl$_2$ with an alkaline hydrazine hydrate solution and reduced) and 5.2 g (0.0634 moles) sodium acetate were heated for 16 hours at 100°C while introducing 2.9 oxygen per hour. By working up the reaction product 0.31 g o-chlorophenyl acetate was obtained.

EXAMPLE 2

113 g (1 mol) chlorobenzene, 60 g (1 mol) acetic acid in vapor form and 4.4 l oxygen (0.2 mol) were passed per hour at 145°C over a catalyst containing 2 percent by weight palladium and 2 percent by weight sodium acetate supported on a carrier of lithium spinel (2.6 % Li, calculated in Al$_2$O$_3$). After reacting for 7 hours and working up the condensation product by distillation, 1.67 g o-chlorophenol were obtained.

What is claimed is:

1. A process for the manufacture of ring substituted phenyl esters or mixtures thereof as a ring substituted phenol derivative, said substituted phenyl esters corresponding to a similarly substituted benzene with substitutents selected from the group consisting of halogen and the radical —OR wherein R is alkyl or cycloalkyl up to 10 carbon atoms, which comprises reacting said substituted benzene with a saturated aliphatic carboxylic acid and molecular oxygen at temperatures within the range of from 50° to 300°C and under pressures within the range of from 1 to 30 atmospheres absolute in the presence of a noble metal or of a compound of a noble metal selected from the group consisting of ruthenium, rhodium, palladium, iridium and platinum.

2. The process of claim 1, wherein the carboxylic acid has at most 4 carbon atoms.

3. The process of claim 1, wherein di-substituted benzene carrying substituents selected from the group consisting of halogen atoms and alkoxy groups is used as starting compound.

4. The process of claim 1, wherein the noble metal is palladium in a free or bound form.

5. The process of claim 1, wherein the process is carried out in the gaseous phase, the noble metal or its compound being supported on a carrier.

6. The process of claim 1, wherein an activator is additionally used, said activator being a salt of a strong base with a weak acid, a buffer system with a carboxylic acid which is used as a starting material as the acid and an alkali metal phosphate, or an acid salt.

* * * * *